S. J. MOSS.
TIRE ATTACHMENT.
APPLICATION FILED JUNE 17, 1921.

1,419,885.

Patented June 13, 1922.
2 SHEETS—SHEET 1.

SAM J. MOSS.
INVENTOR

BY *Victor J. Evans*
ATTORNEY

WITNESS:

S. J. MOSS.
TIRE ATTACHMENT.
APPLICATION FILED JUNE 17, 1921.

1,419,885.

Patented June 13, 1922.
2 SHEETS—SHEET 2.

SAM J. MOSS,
INVENTOR

BY Victor J. Evans
ATTORNEY

WITNESS:

UNITED STATES PATENT OFFICE.

SAM J. MOSS, OF DENNISON, OHIO.

TIRE ATTACHMENT.

1,419,885.   Specification of Letters Patent.   Patented June 13, 1922.

Application filed June 17, 1921. Serial No. 478,410.

*To all whom it may concern:*

Be it known that I, SAM J. MOSS, a citizen of the United States, residing at Dennison, in the county of Tuscarawas and State of Ohio, have invented new and useful Improvements in Tire Attachments, of which the following is a specification.

This invention comprehends the provision of a pneumatic tire protector and anti-skid attachment, wherein old tire casings are cut up into a plurality of sections and arranged to straddle the tread of the tire, means being provided to hold the sections operatively associated with the tire for the purpose specified.

The chief characteristic of the invention resides in providing metallic bands at the opposed sides of the tire, the bands being designed to receive the beads of the casing sections in a manner to hold the said sections properly positioned upon the tire.

In carrying out the invention it is also my purpose to construct the metallic bands into a number of pivotally connected sections, whereby the bands can be folded for shipping, the construction between the sections being such that the bands may be contracted or expanded so that the attachment may be arranged taut about the tire.

The nature and advantages of the invention will be better understood when the following detailed description is read in connection with the accompanying drawings, the invention residing in the combination, construction, and arrangement of parts as claimed.

In the drawings forming part of this application, like numerals of reference indicate corresponding parts throughout the several views, and wherein.

The attachment forming the subject-matter of my invention is made up of a plurality of units or sections 10, the latter forming parts of old tire casings. These units are arranged in spaced relation about the tire A, and not only serve to space the tire from the ground, but is particularly advantageous in preventing skidding.

Figure 1:
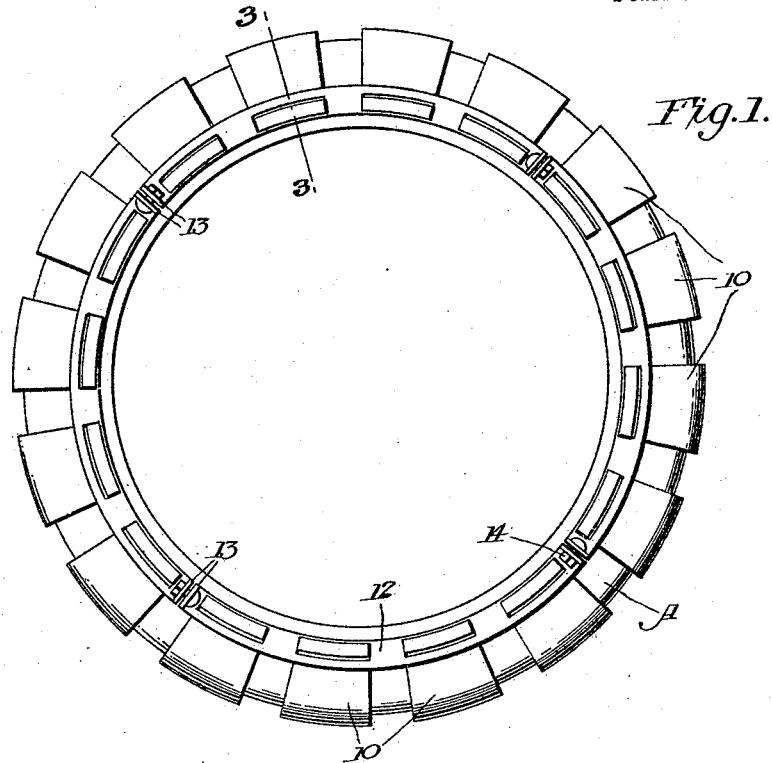
Figure 1 is a side elevation of a tire equipped with the attachment.
Figure 2:
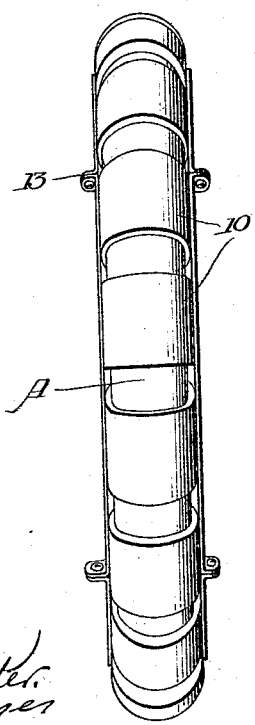
Figure 2 is an edge elevation.
Figure 3:
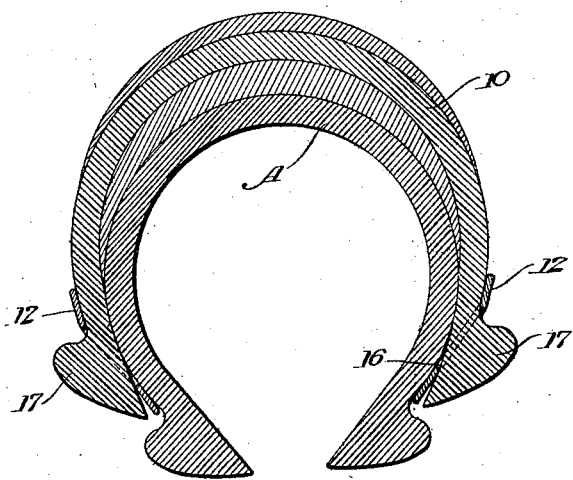
Figure 3 is a sectional view taken on line 3—3 of Figure 1.
Figure 4:
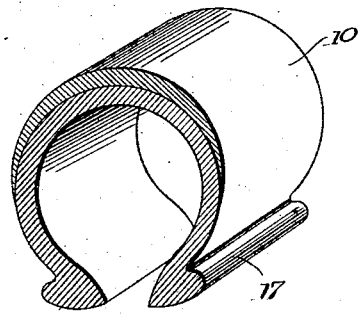
Figure 4 is a detailed view of one of the casing sections.
Figure 5:
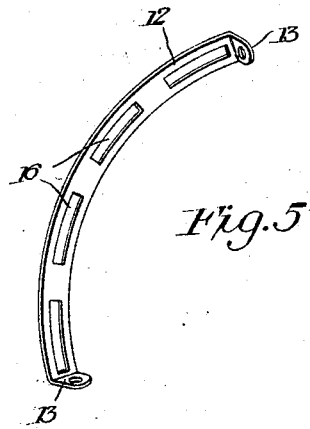
Figure 5 is a similar view of one of the band sections.

While any suitable means may be employed to associate the units 10, I preferably make use of metallic bands 12, and these bands are made up in sections as illustrated. The opposed ends of each section are offset, as at 13, and when the band is in use these offset extremities are arranged in confronting relation and connected together by means of an adjustable element 14. By reason of this construction, it is apparent that the sections of each band can be readily separated, compactly arranged for shipping, but when associated for use, the band in its entirety can be contracted or expanded through the instrumentality of the adjustable element 14 to vary its diameter, and thus hold the attachment in its entirety snugly fitted about the tire. Each section of the band is provided with a plurality of elongated slots 16 of a size to receive the beads 17 of the units 10, and as illustrated in Figure 2 when the units 10 are associated with the said bands, the beads 16 assume a position which prevents casual separation of the parts.

The attachment is very simple in construction, and after purchasing the metallic bands, it is obvious that the attachment can be made up from old tire casings.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A combined tire protector and anti-skid device including a plurality of old tire sections arranged to straddle the tread of the tire, metallic bands arranged at each side of the tire, each band being made up of a plurality of curved sections terminating to provide offset extremities, the offset extremities of the respective sections having threaded openings, adjustable elements passed through said openings for adjustably securing said sections together, and each section having a plurality of elongated slots adapted to receive the beads of the tire section as and for the purpose specified.

In testimony whereof I affix my signature.

SAM J. MOSS.